April 2, 1935.   V. E. SHOWALTER   1,996,354
COMPASS DEVIATION CORRECTOR
Filed Oct. 21, 1931
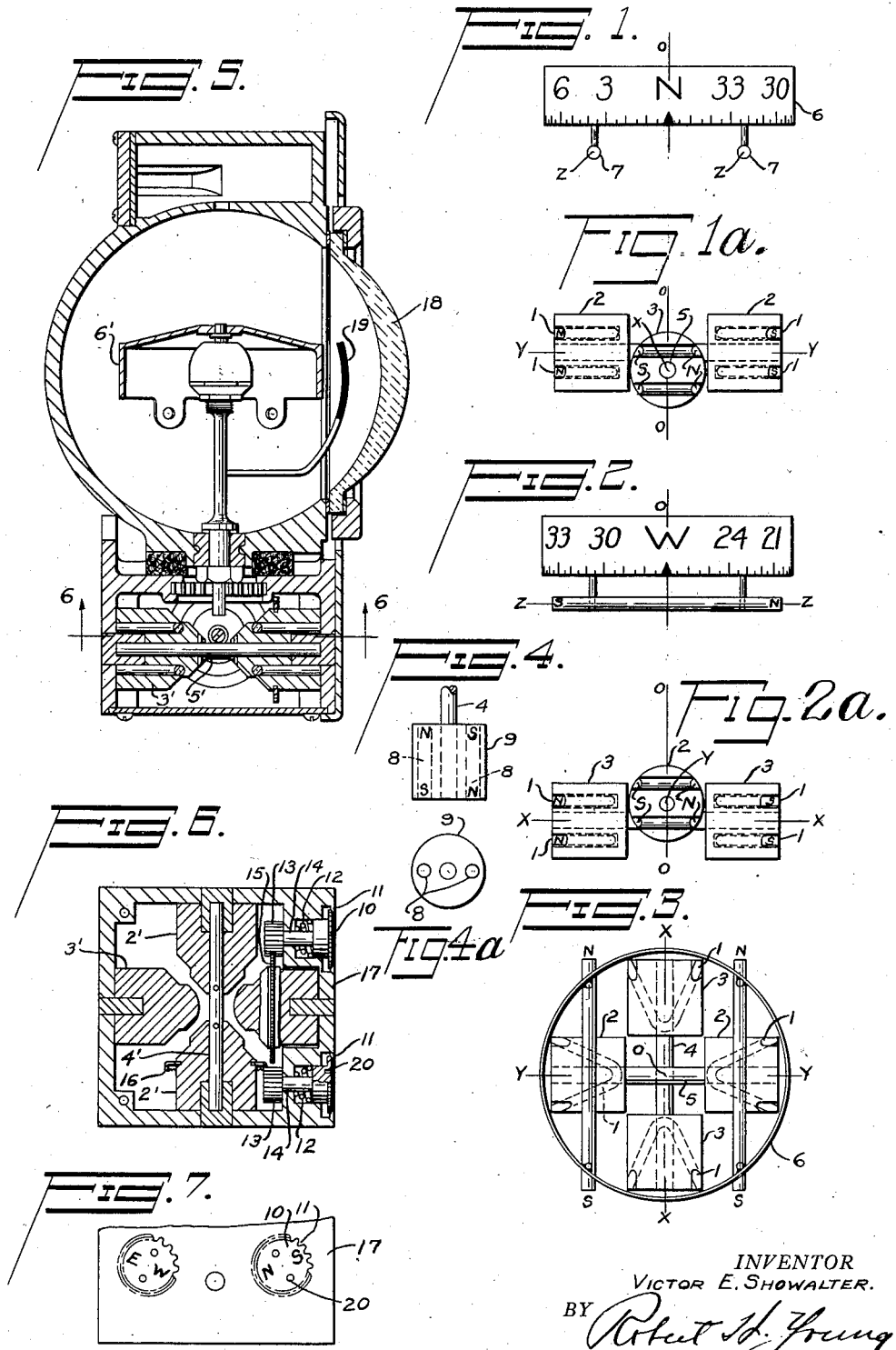
INVENTOR
VICTOR E. SHOWALTER.
BY
ATTORNEY Patented Apr. 2, 1935

1,996,354

UNITED STATES PATENT OFFICE 1,996,354

COMPASS DEVIATION CORRECTOR

Victor E. Showalter, Elgin, Ill.

Application October 21, 1931, Serial No. 570,200

1 Claim. (Cl. 33—225)

The present invention relates to a device for correcting the deviation of a magnetic compass and is particularly designed for use in the correction of the deviation of small compasses such as are used in aircraft or small water-craft.

The principal object of the invention is to provide a deviation corrector which may be used for correcting ordinary semicircular deviations with substantial accuracy by persons unfamiliar with magnetism or magnets or their effect upon the compass.

Another object is to provide a simplified mechanism for obtaining the results hereinabove described, which will require only the simplest of verbal or written instructions for operation, and which will further be completely housed against accidental disturbance of adjusted parts or loss of parts, prior adjustment.

It is common to the art to position aircraft or water-craft in a series of known magnetic headings through employment of a swinging base or table. Compensation of the compass for the four cardinal magnetic headings may be readily effected through employment of the hereinafter described mechanism.

With the foregoing and other objects in view, which will appear as the description proceeds, the invention consists of improvements embodied in a semicircular deviation corrector as hereinafter more fully illustrated and described in the accompanying drawing and more particularly pointed out in the appended claim.

Referring to the drawing, in which numerals of like character designate similar parts through the several views:

Fig. 1 is a diagrammatical side view of a compass card, and

Fig. 1a is a corresponding view of the attached magnets showing relative positioning of the compass deviation corrector element with reference to the north heading;

Fig. 2 is a diagrammatical side view of the card, and

Fig. 2a is a corresponding view of the corrector elements;

Fig. 3 is a diagrammatical plan view of the above showing relative positionings of the compass card and attached magnets and the compass deviation corrector element;

Fig. 4 is a diagrammatical plan and end view of a modified form of compensating magnet and container;

Fig. 4a is an end view of the parts of Fig. 4.

Fig. 5 is a cross-sectional side view of an ordinary aircraft compass embodying the improvements of my invention;

Fig. 6 is a cross-sectional plan view of the above compass through the compass deviation corrector element taken on line 6—6, Fig. 5; and Fig. 7 is a partial side view of the compass deviation corrector element housing.

The principal parts of my invention consist of the small V shaped compensating magnets 1 secured in containers 2 and 3. The containers 2 and 3 are retained in fixed relationship to each other by means of the shafts 4 and 5. The foregoing, forming the basic parts of the corrector element proper, are placed immediately beneath the compass card 6, to which are permanently secured the compass card magnets 7. In Figs. 1 and 2 the axis O—O passes vertically through the mid-points of longitudinal axes X—X and Y—Y of the shafts 4 and 5 and through the centroid of the plane of symmetry of the compass card 6. Axis X—X is shown immediately beneath and parallel to a center line passed through the north and south headings of the compass card 6 and is further shown equidistant from and parallel to the longitudinal axes Z—Z of the compass card magnets 7. Axis Y—Y is shown immediately beneath and parallel to a center line passed through the east and west headings of the compass card 6 and is further shown equidistant from and at right angles to the longitudinal axes Z—Z of the compass card magnets 7. It will be still further noted, in Figs. 1 through 3, that compensating magnets 1 have been so positioned that planes dividing each magnet into two equal V shaped parts will be parallel to a plane passed through the axes Z—Z of the compass card magnets 7. Equally desirable results may be obtained if the foregoing parts forming the corrector element, are placed immediately above the compass card 6, the position of all parts discussed above remaining the same with reference to the vertical axis O—O. Fig. 4 shows a modification of compensating magnet 1 and containers 2 and 3. Two compensating magnets 8 are secured parallel to and equidistant from shaft 4 in the container 9. It will be noted that the polarity arrangement of Fig. 3 has been retained by placement of the north pole of the right-hand magnet and the south pole of the left-hand magnet at the outer extremity of container 9.

The operation of my invention is as follows:

Providing the strengths of the compensating magnets 1 shown in Figs. 1 through 3 are of equal magnitude, there will theoretically be exerted no influence upon the magnetic field in which the card magnets 7 are immersed as long as the planes dividing the compensating magnets 1 into two equal V-shaped parts are maintained parallel to the plane through the center lines of the card magnets 7. The above described positioning of the compensating magnets 1 is called the neutral position.

When the containers 2 shown in Fig. 1 through 3 are rotated in either direction from the neutral position referred to above through a certain angle, the standing fields of these magnets rotate with them through the same angle and exercise a deflecting force upon the magnetic field in which magnets 7 are immersed, which deflects this latter field in such a direction and through such an angle as will effect compensation on the north heading.

When the containers 3 shown in Fig. 1 through 3 are rotated in either direction from the neutral position referred to above through a certain angle, the standing fields of these magnets rotate with them through the same angle and exercise a deflecting force upon the magnetic field in which magnets 7 are immersed, which deflects this latter field in such a direction and through such an angle as will effect compensation on the west heading.

Figs. 5 and 6 show the application of my invention to an ordinary compass. Adjustment of the containers 2' and 3' is accomplished through depression of the locks 10 out of their detents 11 against the tension of the springs 12 and rotation of the pinions 13 rigidly attached to the locks 10 by means of the shafts 14. The above rotations result in corresponding rotation of the gear 15 rigidly attached to one of the containers 3' or corresponding rotation of the gear 16 rigidly attached to one of the containers 2'. As has been previously stated containers 2' are held in fixed relationship to each other by means of the shaft 4', and containers 3' are held in similar relationship to each other by means of the shaft 5'. The balance of the parts shown in Fig. 5 comprise conventional elements of an ordinary compass and special reference is made herein only to cover glass 18 and lubber line 19 of Fig. 5.

Fig. 7 shows that portion of the exterior of the deviation corrector housing 17, which lies immediately beneath the cover glass 18. It will be noted that the right-hand lock 10 has been marked "N" on the left and "S" on the right-hand portion of the lock face. It will also be noted that the left-hand lock 10 has been marked "E" on the left and "W" on the right-hand portion of the lock face and that pin holes 20 have been incorporated in the faces of both locks to permit rotation of the locks by means of an ordinary pin-faced key. The profiles of the detents 11 are also clearly shown in Fig. 7.

As has been stated above, it will be necessary to furnish the person seeking to compensate the compass of an aircraft or small watercraft equipped with the above-described deviation corrector, with simple verbal or written instructions based upon the following. Let it be assumed that the lubber line 19 of the compass has been placed in proper fore-and-aft relationship to the craft and that the craft has been put onto a north course by means of a swing base. Let it be further assumed that the compass card 6' has been found to indicate a reading of 30 degrees. It is obvious that the compass card 6' must be rotated 30 degrees in a clockwise direction if the north cardinal of the card is to be made to coincide with the lubber line 19, as viewed through the cover glass 18. Clockwise rotation of the compass card 6' may be accomplished by counter-clockwise movement of the right-hand lock 10, the latter movement directly controlling the degree of compass card compensation desired. If the craft is then swung onto a south course, it will be found that clockwise movement of the right-hand lock 10 will produce clockwise compensation of the compass card 6', and counter-clockwise movement of the same lock, counter-clockwise compensation of the card. It may be discovered that compensation of the south cardinal has adversely affected previous compensation of the north cardinal, in which case it will be necessary to adopt that compensation compromise which will result in minimum combined deviation of the north and south cardinals from the lubber line 19. If the craft is further swung onto an east course, it will be found that counter-clockwise movement of the left-hand lock 10 will produce clockwise compensation of the compass card 6', and vice versa. Finally, if the craft is swung onto a west course, it will be found that clockwise movement of the left-hand lock 10 will produce clockwise compensation of the compass card 6' and vice versa. Also, it may be necessary to adopt compensation compromise between the east and west cardinals with reference to minimizing combined deviation from the lubber line 19.

This invention is provided for the purpose of correcting deviations known as semicircular deviations of the compass as expressed by the coefficients B and C in the theory of compass adjustment. It is not designed to take care of such extraordinary or unusual deviations as correction of quadrantal deviations arising from masses of soft iron in proximity to the compass. The corrections provided by this invention will, however, except in most unusual cases, be amply sufficient for small compasses such as are used in aircraft or small water-craft.

What I claim as new and desire to secure by Letters Patent, is:

A compass deviation corrector comprising, a housing, two sets of magnets carried by said housing, each set being fixed at right angles to the other and to a vertical axis of reference, each set of said magnets including diametrically oppositely disposed magnets having a common axis of symmetry and being arranged so that their adjacent ends are dissimilar in polarity, the oppositely disposed magnets of each set of magnets being equidistant from said vertical axis, their axes of symmetry intersecting said vertical axis, means for supporting the magnets of each set of magnets in relatively fixed relationship, and further means for individually adjusting said supporting means to adjust each set of magnets as a unit about its axis of symmetry to a desired setting.

VICTOR E. SHOWALTER.